(12) United States Patent
Fontbonne et al.

(10) Patent No.: US 9,797,772 B2
(45) Date of Patent: Oct. 24, 2017

(54) METHOD FOR CONTROLLING THE GAIN AND ZERO OF A MULTI-PIXEL PHOTON COUNTER DEVICE, AND LIGHT-MEASURING SYSTEM IMPLEMENTING SAID METHOD

(71) Applicant: AREVA NC, Courbevoie (FR)

(72) Inventors: Jean-Marc Fontbonne, Caen (FR); Jean Colin, Douvres-la-Delivrande (FR); Cathy Fontbonne, Caen (FR); Jacky Allee Jehanno, Gaujac (FR)

(73) Assignee: AREVA NC, Courbevoie (FR)

( * ) Notice: Subject to any disclaimer, the term of this patent is extended or adjusted under 35 U.S.C. 154(b) by 0 days.

(21) Appl. No.: 14/767,911

(22) PCT Filed: Feb. 18, 2014

(86) PCT No.: PCT/EP2014/053074
§ 371 (c)(1),
(2) Date: Aug. 13, 2015

(87) PCT Pub. No.: WO2014/128101
PCT Pub. Date: Aug. 28, 2014

(65) Prior Publication Data
US 2016/0003671 A1    Jan. 7, 2016

(30) Foreign Application Priority Data
Feb. 22, 2013   (FR) ..................... 13 51588

(51) Int. Cl.
*G01J 1/44*     (2006.01)
*G01T 1/24*     (2006.01)
*G01T 1/40*     (2006.01)

(52) U.S. Cl.
CPC ............. *G01J 1/44* (2013.01); *G01T 1/248* (2013.01); *G01T 1/40* (2013.01); *G01J 2001/442* (2013.01); *G01J 2001/4466* (2013.01)

(58) Field of Classification Search
CPC ............... G01J 1/44; G01J 2001/442; G01J 2001/4466; G01T 1/40; G01T 1/248
See application file for complete search history.

(56) References Cited

U.S. PATENT DOCUMENTS

| 3,800,143 A |   | 3/1974 | Fishman et al. |
| 4,600,306 A | * | 7/1986 | Hara ................. G01N 21/6408 250/461.1 |

(Continued)

FOREIGN PATENT DOCUMENTS

| RU | 2006142684 A  | 6/2008 |
| WO | 2009115956 A2 | 9/2009 |
| WO | 2012/158922 A2 | 11/2012 |

OTHER PUBLICATIONS

Marrocchesi, P.S. et al.; Active Control of the Gain of a 3 mm * 3 mm Silicon PhotoMultiplier; Nuclear Instruments & Methods in Physics Research A; Elsevier; Elsevier B.V., vol. 602, Apr. 21, 2009; pp. 391-395.

(Continued)

*Primary Examiner* — John Lee
(74) *Attorney, Agent, or Firm* — Nixon Peabody LLP; Khaled Shami

(57) ABSTRACT

A method for controlling the gain and zero of a multiple pixel photon counter device, and light-measuring system implementing said method.
Signals provided by the device are acquired for predefined periods, until a predefined total measurement time is reached, an amplitude histogram is formed from the acquired signals, the positions of two consecutive peaks, (Continued)

measurable on the histogram, are determined, an error signal is produced, which is equal to the deviation between both peaks and, by means of the same, the voltage supplying the device is regulated, so as to keep the deviation equal to a predefined set point.

7 Claims, 3 Drawing Sheets

(56) References Cited

U.S. PATENT DOCUMENTS

| | | | | |
|---|---|---|---|---|
| 5,677,536 | A * | 10/1997 | Vickers | G01T 1/1642 250/252.1 |
| 5,866,907 | A * | 2/1999 | Drukier | G01N 33/60 250/328 |
| 7,283,166 | B1 * | 10/2007 | Billman | H01J 31/50 250/214 VT |
| 7,312,457 | B2 * | 12/2007 | Sergent | G01T 1/17 250/370.06 |
| 7,778,783 | B2 * | 8/2010 | Lingren | G01T 3/06 250/307 |
| 7,881,893 | B2 | 2/2011 | Montemont | |
| 9,372,271 | B2 * | 6/2016 | Adolph | G01T 1/40 |
| 2004/0017224 | A1 * | 1/2004 | Tumer | H03F 3/087 327/51 |
| 2004/0159792 | A1 | 8/2004 | Andreaco et al. | |
| 2006/0243916 | A1 * | 11/2006 | Sergent | G01T 1/17 250/370.06 |
| 2007/0095157 | A1 * | 5/2007 | Lingren | G01T 3/06 73/863 |
| 2008/0061224 | A1 | 3/2008 | Montemont | |
| 2010/0078569 | A1 * | 4/2010 | Jarron | A61B 6/037 250/363.04 |
| 2013/0044248 | A1 * | 2/2013 | Tumer | H03F 3/087 348/302 |
| 2014/0042326 | A1 * | 2/2014 | Miyaoka | G01T 1/1642 250/362 |
| 2014/0145072 | A1 * | 5/2014 | Adolph | G01T 1/40 250/261 |
| 2016/0003671 | A1 * | 1/2016 | Fontbonne | G01T 1/248 250/208.2 |
| 2016/0274246 | A1 * | 9/2016 | Kimura | G01T 1/17 |
| 2016/0306055 | A1 * | 10/2016 | Adolph | G01T 1/40 |

OTHER PUBLICATIONS

MPPC® Multi-Pixel Photon Counter; Compact opto-semiconductors with excellent photon counting capability; Hamamatsu, Cat. N°. KAP D0002E09, May 2012; 27 pages.

International Search Report or PCT Application No. PCT/EP2014/053074 dated Jun. 2, 2014.

Preliminary Search Report for France Application No. 13 51588 dated Jan. 8, 2014.

International Preliminary Report on Patentability for PCT Application No. PCT/EP2014/053074 dated Jun. 2, 2015.

Search Report dated Jun. 19, 2017 of Russian Patent Application No. 2015140136/28.

* cited by examiner

METHOD FOR CONTROLLING THE GAIN AND ZERO OF A MULTI-PIXEL PHOTON COUNTER DEVICE, AND LIGHT-MEASURING SYSTEM IMPLEMENTING SAID METHOD

CROSS-REFERENCE TO RELATED PATENT APPLICATION

The present application is a National Stage Application of International Application No. PCT/EP2014/053074 entitled "METHOD FOR CONTROLLING THE GAIN AND ZERO OF A MULTI-PIXEL PHOTON COUNTER DEVICE, AND LIGHT-MEASURING SYSTEM IMPLEMENTING SAID METHOD" filed Feb. 18, 2014, which claims priority to French Patent Application Number 13 51588 filed Feb. 22, 2013, the contents of which are incorporated herein by reference in their entirety.

TECHNICAL FIELD

The present invention relates to a method for controlling the gain and zero of a multiple pixel photon counting device, in particular of an MPPC (registered trademark from Hamamatsu Photonics K.K) type detector, that is a multi-pixel photon counter-type detector.

It also relates to a light measuring system implementing this method.

It is applicable in particular to flow cytometry, high energy physics and the field of the nuclear physic instrumentation.

STATE OF PRIOR ART

A method for controlling the gain of an MPPC®-type detector is already known from the following document which will be referred to:

P.S. Marrocchesi et al., Active Control of the Gain of a 3 mm×3 mm Silicon Photomultiplier, Nuclear Instruments and Methods in Physics Research A 602 (2009), pp. 391-395.

The method known from this document consists in thermally controlling the MPPC® detector.

This known method has one drawback: it does not enable the MPPC® detector to be used in any environment.

DISCLOSURE OF THE INVENTION

The object of the present invention is to overcome this drawback.

For this, the controlling method, object of the invention, does not use the "temperature" parameter. And, as will be better seen in what follows, this method even uses a defect of the MPPC® detector, namely the simultaneous counting of the thermal agitation electrons.

Precisely, the object of the present invention is to provide a method for controlling the gain of an MPPC® detector, more generally a multiple pixel photon counting device. This device conventionally comprises an array of avalanche photodiodes operating in Geiger mode, is supplied with a voltage and provides a signal when it detects photons.

The method is characterized in that:
 the signals provided by the device are acquired for predefined periods, until a predefined total measurement time is reached,
 an amplitude histogram, including a set of peaks is formed, from the signals thus acquired,
 the respective positions of two consecutive peaks, measurable on the histogram, are determined,
 an error signal which is equal to the deviation between both consecutive peaks is produced, and
 by means of the error signal, the voltage which supplies the device is regulated, so as to keep the deviation equal to a predefined set point.

According to a preferred embodiment of the method object of the invention, the predefined periods are equal to each other and chosen in an interval ranging from 50 ns to 500 ns.

Preferably, the predefined total measurement time is chosen in an interval ranging from 0.5 s to 10 s.

According to a preferred embodiment of the invention, both consecutive peaks are the first and second peaks of the histogram.

The present invention also relates to a light measuring system implementing the method object of the invention. This system comprises:
 the photon counting device,
 a supply device for providing the high voltage to the photon counting device,
 an amplification device for amplifying the signals provided by the photon counting device and providing amplified signals, and
 a processing device for acquiring the amplified signals and processing the same so as to count the photons, and to form the histogram, determining both consecutive peaks and producing the error signal, and
 a regulation device for controlling the supply device by regulating the voltage from the error signal.

The present invention further relates to another light measuring system, implementing the method object of the invention. This other system comprises:
 the photon counting device,
 a supply device for providing the high voltage to the photon counting device,
 first and second amplification devices connected in series, for amplifying the signals provided by the photon counting device and providing amplified signals,
 a first processing device for acquiring the signals amplified by the first amplification device, forming the histogram, determining both consecutive peaks and producing the error signal,
 a regulation device for controlling the supply device by regulating the voltage from the error signal, and
 a second processing device for processing the amplified signals, from the second amplification device, so as to count the photons.

BRIEF DESCRIPTION OF THE DRAWINGS

The present invention will be better understood upon reading the description of exemplary embodiments given hereinafter, by way of purely indicating and in no way limiting purposes, making reference to the appended drawings in which.

DETAILED DISCLOSURE OF PARTICULAR EMBODIMENTS

Figure 1:
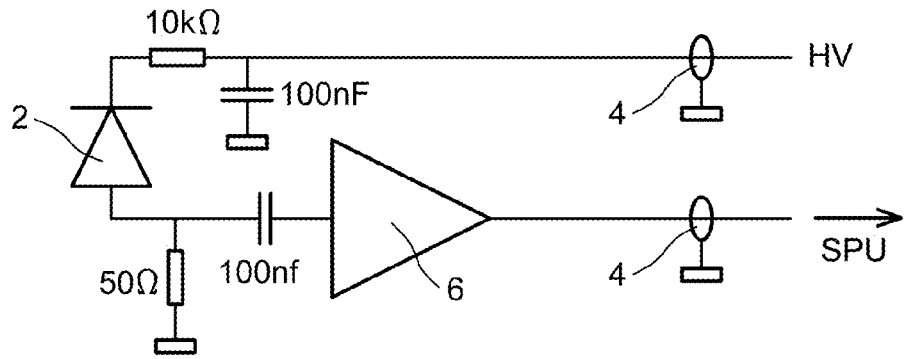
FIG. 1 schematically illustrates an electronic circuit including an MPPC®-type detector associated with an amplifier, FIG. 2 schematically illustrates another electronic circuit including an MPPC®-type detector associated with two amplifiers, FIG. 3 schematically illustrates an example signal that can be observed on an oscilloscope and which comes from an MPPC®-type detector, FIG. 4 schematically illustrates an example of amplitude histogram which is used in the invention.

Hereinafter, several examples of the method object of the invention are given, enabling the gain and zero of an MPPC®-type detector to be stabilized. It is reminded that the response of such a detector depends on the high voltage applied thereto and the temperature to which it is subjected.

It is further known that an MPPC®-type detector has a defect: it naturally and simultaneously "counts" thermal agitation electrons several hundred thousand times per second. This defect is the one used in the present invention for stabilizing the gain of the detector at a level chosen by the user, and for measuring the zero of this detector (absence of light or signal). Therefore, any measurement made by the MPPC®-type detector can be expressed, in an absolute manner, in number of incident photoelectrons, on a wide input range, regardless of the operation temperature.

Let us remind first some characteristics of an MPPC®-type detector. About the latter, the following document can be referred to:

MPPC® Multi-pixel Photon Counter, Compact Opto-semiconductors with Excellent Photon Counting Capability, Hamamatsu, Cat. No. KAP D0002E09, May 2012.

Such a detector includes an array of small-sized avalanche photodiodes, which are physically separated from each other but provided on a same silicon substrate. When an incident photon interacts on any of these unit photodiodes, this produces an electric signal the charge of which is very reproducible from one interaction to the other. This provides an MPPC®-type detector with exceptional performances in terms of measuring a "single photon". When N photons simultaneously interact at the surface of the MPPC® detector, on different sites of photodiodes, a signal the charge of which represents, on the average, N times the previous unit charge is recovered. The MPPC® detector can thus be used for measuring the number of photons which reach simultaneously its surface.

The difficulty encountered upon using such a detector is related to the physics of the avalanche which occurs in the photodiodes. This avalanche very strongly depends on the depletion voltage which enables the detector to be biased, as well as the temperature of the detector itself. Hence, it is generally recommended to thermally control this detector so as to remove the influence of temperature. But this goes against the use of an MPPC®-type detector in any environment.

Besides, the unit photodiodes of the MPPC® detector are made of silicon. Therefore, they naturally release, by thermal agitation, electrons which are processed in the same way as the photoelectrons produced by incident light. These thermal electrons thus have a "signature" identical to that of these photoelectrons. The number of thermal electrons per unit time depends both on the temperature and high voltage applied (but marginally for the latter). Further, an MPPC® detector "counts" naturally several hundred thousand to several million counts per second below the single photon threshold. This aspect can seem to be negative at first glance, but it is the one that is used, paradoxically, to control the gain of an MPPC®-type detector.

FIG. 1 schematically illustrates the circuit which is advocated by Hamamatsu Company to use an MPPC® detector. The latter has reference 2 in FIG. 1. In the latter, as in FIG. 2, the reference 4 designates BNC-type connectors. The reference HV designates the voltage (in the order of 70V) which supplies the MPPC® detector. The current generated by the same is sent to an amplifier 6 the gain of which is 100 and which is impedance-matched. The represented circuit produces an SPU signal of several millivolts (10 mV to 20 mV in the example) when a photoelectron or a thermal agitation electron is detected by the MPPC® detector.

Figure 2:
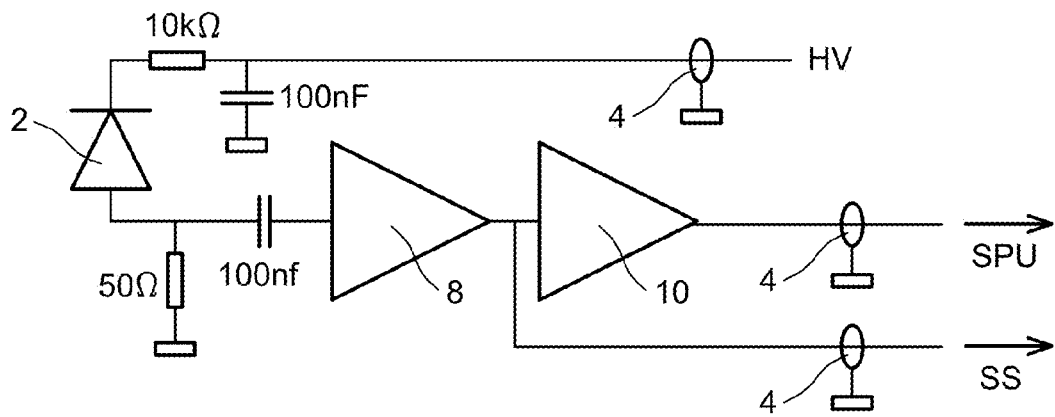

In view of the dynamic limitations of the circuit represented in FIG. 1, it is preferred to use the circuit schematically represented in FIG. 2 in the present invention.

As can be seen, this circuit comprises a first amplifier 8 the gain of which is 10. This enables the circuit to operate even if a very great number of photons reach the MPPC® detector. The first amplifier 8 is followed by a second amplifier 10 the gain of which is 10. This amplifier 10 provides the SPU signal which corresponds to a single photoelectron and has a readily exploitable voltage level (10 mV to 20 mV). At the output of the first amplifier 8, a signal SS is recovered, the voltage level of which is in the order of 1 mV to 2 mV and which is, for example, the means for measuring a very great number of photoelectrons, received in a pulsed manner for a short time.

Figure 3:
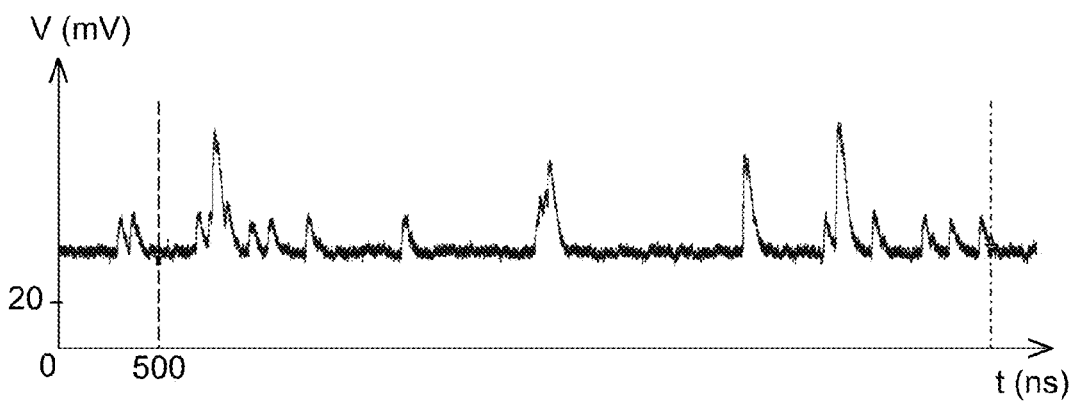

The signal acquired on the analog outputs of the circuits represented in FIGS. 1 and 2 can be observed on an oscilloscope. A signal of the kind of that the one which is represented in FIG. 3 is thus obtained.

This is a standard oscillogram of an MPPC® detector, obtained at the output of a voltage preamplifier the gain of which is equal to 100 and which is matched to 50Ω. The time t is drawn in abscissa and expressed in nanoseconds. The voltage V is drawn in ordinate and expressed in millivolts. For each pulse, either the maximum amplitude of the signal, either the charge delivered by the detector can be measured. This charge corresponds to the integration of the signal for a duration which is defined by the user and ranges typically from a few nanoseconds before the triggering instant to about one hundred nanoseconds after this instant, the triggering instant being defined by the instant when the signal exceeds a threshold given by the user, typically a few millivolts above the background noise.

Thereby, amplitude histograms are obtained. They correspond to the accumulation of the measurements on a given time, which is typically in the order of 1 s, and are of the kind of the histogram which is represented in FIG. 4.

Figure 4:
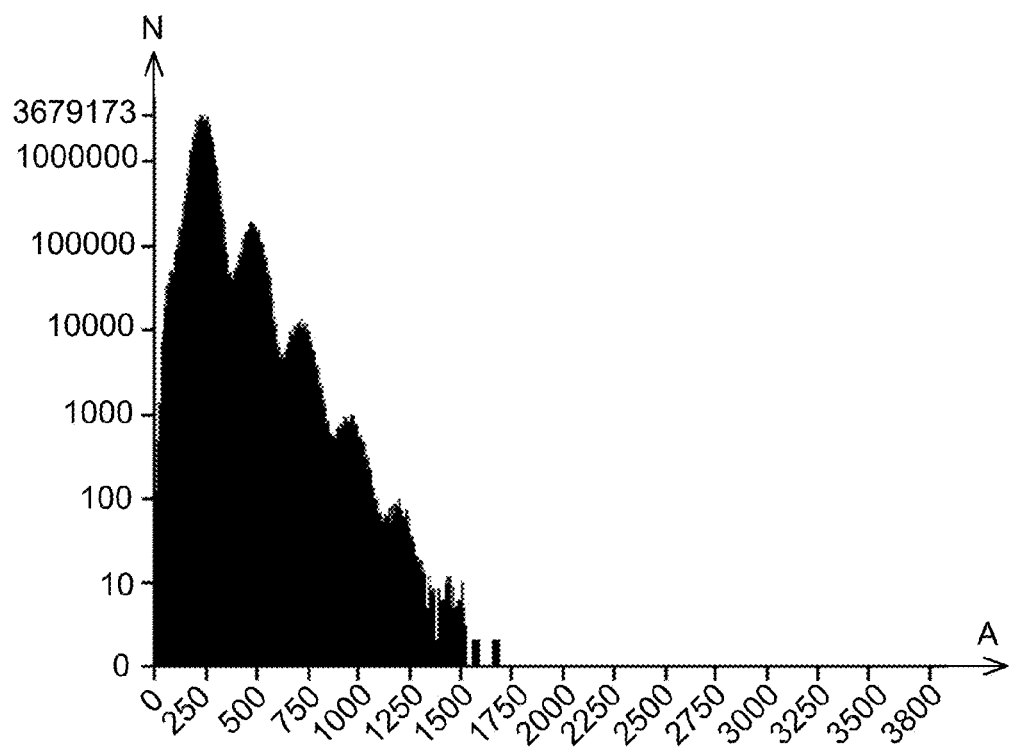

In this FIG. 4, the amplitude coded A (in arbitrary units) is drawn and in ordinate, the number N of measured counts, at the given amplitude, on the abovementioned 1 s-accumulation period.

A succession of peaks can be seen in FIG. 4. The first peak corresponds to a photoelectron or a thermal agitation electron. The second peak corresponds to two units, that is two photoelectrons or two thermal agitation electrons, etc. The triggering threshold of the data acquisition system (corresponding to the device 18 of FIG. 6) is located at a level in the order of 0.2 unit in the example represented.

When the voltage applied to the MPPC® detector or the temperature of the latter vary, the histograms recorded change dramatically. The graph of FIG. 5 illustrates the dependence of the histograms on the voltage, for a fixed temperature of the MPPC® detector.

Figure 5:
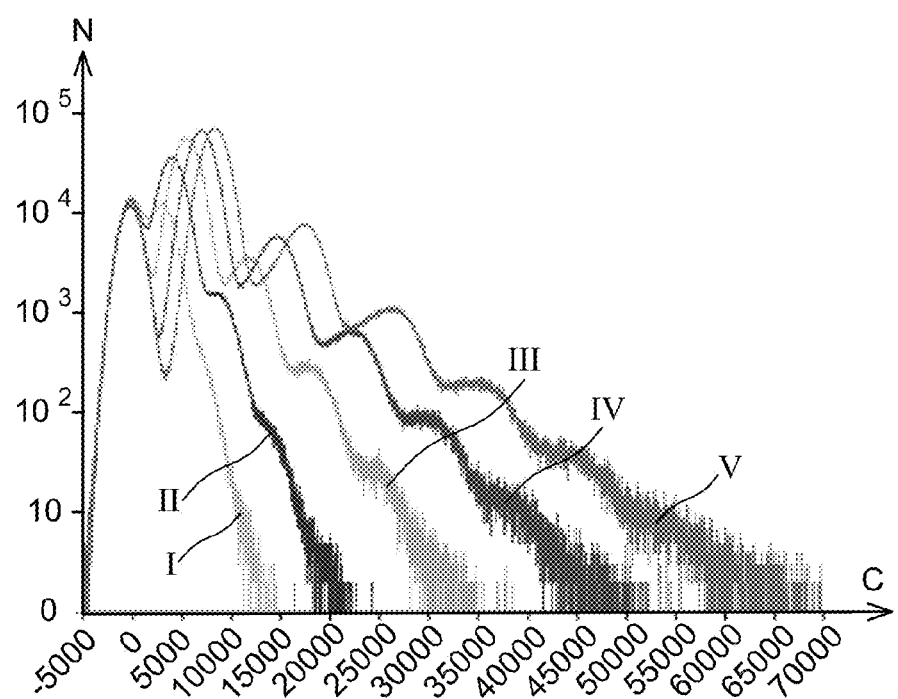
FIG. 5 is a graph which illustrates the dependency of such histograms on the voltage applied to an MPPC®-type detector, for a fixed temperature thereof.

In this FIG. 5, in abscissa, the measured charge C (in arbitrary units) is drawn and in ordinate, the number N of measured counts, at the given amplitude, on the abovementioned accumulation period of 1 s. And curves I, II, III, IV, and V correspond to the voltages 70V; 70.2V; 70.4V; 70.6V, and 70.8V, respectively.

It is noticed in particular that any modification in the influence quantities (voltage applied to the MPPC® detector or temperature of the latter) results in offsetting the position of the peaks as well as the count number they contain. Thus, for example, a "count" dealt to the channel 55000 would correspond to 8 photoelectrons for a 70.6V voltage whereas it would be counted for 18 photoelectrons for a 70V high voltage.

This dependency is also reflected, for example, by an approximate doubling of the count number for each 7° K increment on the temperature of the MPPC® detector, coupled with a decrease in the order of 40 to 50% of the gain of the MPPC® detector. When the latter is not thermostated, its use thus imposes the control of its gain, or at least the measurement of this gain, in order to compensate for this dependency.

In the following, several examples of the method object of the invention are given, enabling these variations to be brought back to a fair level, equal to a few percent, under temperature conditions generally noticed for a work in a glove box, that is for a temperature ranging between about 20° C. to about 40° C.

According to an example of the method for controlling the gain, object of the invention, any means (for example: adjusting the spectrum by Gaussians or location of the maxima) is used to measure the position of the peaks corresponding to 0, 1, 2, etc . . . amplified electrons and an error signal is produced on the position of these peaks. This error signal is used to feedback the voltage which is applied to the MPPC® detector.

Depending on the system available to exploit the signal provided by the MPPC® detector, the peak corresponding to "0", that is corresponding to an absence of signal, can be properly measured or not. If this measurement is correct, it is sufficient to note down the position of the peak number 1, or first peak, to correct the measurement system, incorporating the MPPC® detector. In fact, this is a textbook case which poorly operates with the MPPC® detectors, because of the strong dark counting rate of the same.

In the opposite case, the peak number 1, or first peak, and the peak number two, or second peak, or any combination of peaks which are more readily measurable that these first and second peaks can be simultaneously exploited. The deviation between two successive peaks enables the gain of the MPPC® detector to be directly determined whereas the relative position of these two peaks enables the position of the zero of the MPPC® detector to be determined, without having to directly measure this position.

For the method to properly operate, the peak measurement should be performed in a fair time, during which the temperature of the MPPC® detector does not vary or varies in a sufficiently low way for this variation to be able to be disregarded. In view of the dark counting of the MPPC® detectors (several hundreds of thousands of counts per second), the measurement and correction can be performed in some fractions of second, with an uncertainty level in the order of 1%.

Therefore, the user can define a sensitivity set point. The calculation unit which is used for implementing the method measures the sensitivity by noting down the deviation between two identified peaks and produces an error signal between the set point and the measurement. This error signal is then sent to a correcting device which can be, for example, a simple PID (Proportional Integrate Derivate) corrector and which controls the value of the voltage applied to the MPPC® detector. After some time, defined by adjusting the corrector, the voltage applied to the MPPC® detector is positioned at a level such that the deviation between the reference peaks corresponds to the set point defined by the user. The sensitivity of the MPPC® detector is consequently controlled and remains constant irrespective of the temperature to which the measurement system incorporating the MPPC® detector is operated.

As the controlling method enables the sensitivity of the MPPC® detector to be adjusted and the position of the zero thereof to be measured, therefore, it is possible to express any light pulse into a number of incident photoelectrons rather than in arbitrary units which both depend on the temperature and the voltage applied to the MPPC® detector. The measuring system incorporating the latter is then calibrated in absolute number of photoelectrons.

In another example of the invention, a measurement chain comprising an MPPC® detector followed by means for amplifying the signals it provides, in turn followed by acquisition means, is used. The signals provided by the MPPC® detector are acquired for periods that can range from 50 ns to 500 ns and are for example 100 ns, until the total acquisition time reaches a value between 0.5 s and 10 s, for example 1 s. These acquisitions enable an amplitude histogram to be formed. On the latter, the respective positions of peaks no 1 and 2 are noted down: peak no 1 is located for example at the channel 250 and peak no 2 at the channel 500.

Then, the control begins. An error signal is produced, that is the deviation between peaks no 1 and 2, which is 500−250, that is 250 in the above example. On the other hand, a set point has been chosen for the deviation considered, for example a value equal to 300. As 250 is lower than this value, the voltage applied to the MPPC® detector is increased so as to increase the deviation between both peaks. More precisely, the error signal used is equal to the set point minus the deviation found between both peaks.

Generally, rather than using both first peaks of the amplitude histogram, two consecutive peaks of the latter are used, which are easily measurable.

The acquisition means enable the amplitude histograms to be obtained and contain a calculation unit which determines the error equal to the set point minus the deviation between the respective channels of both peaks. The error signal resulting therefrom is sent to regulation means which control the voltage applied to the MPPC® detector, so as to keep the gain thereof constant.

The method just explained is constantly implemented in the measuring chain considered.

It is also set forth that the invention is preferably implemented using a circuit of the kind that is represented in FIG. 2 rather than a circuit of the kind represented in FIG. 1: the latter would lead to too high a signal to count several thousand photoelectrons reaching simultaneously, or in a very short time interval, the surface of the MPPC® detector, thus reducing the total permissible dynamics.

Figure 6:
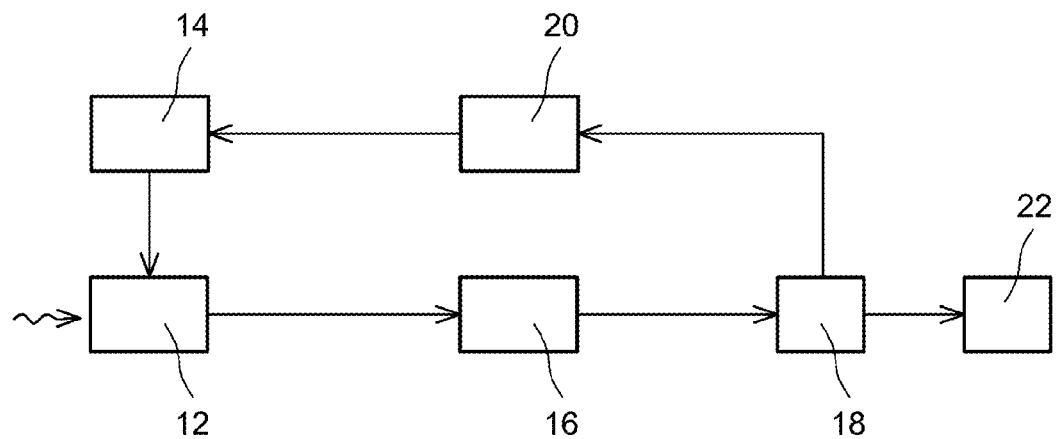
FIGS. 6 and 7 are schematic views of two examples of the system object of the invention.

FIG. 6 is a schematic view of a first example of the light measuring system, object of the invention. It comprises:
  a photon counting device 12, for example an MPPC® detector (the array of avalanche photodiodes of which, operating in Geiger mode, is not represented),
  a voltage supply device 14 for providing a supply voltage to the photon counting device 12, an amplifier 16 for amplifying the signals provided by the photon counting device 12, and a processing device 18 for acquiring the amplified signals, forming a histogram, determining two consecutive peaks and producing an error signal, as has been seen before.

The system of FIG. 6 also comprises a regulation device 20, for example of the PID type, which receives the error signal and controls the voltage supply device 14 for regulating the voltage from the error signal.

Further, in the example of FIG. 6, the processing device 18 is also provided to process the amplified signals so as to count the photons. This device 18 is provided with a device 22 for displaying the results.

Figure 7:
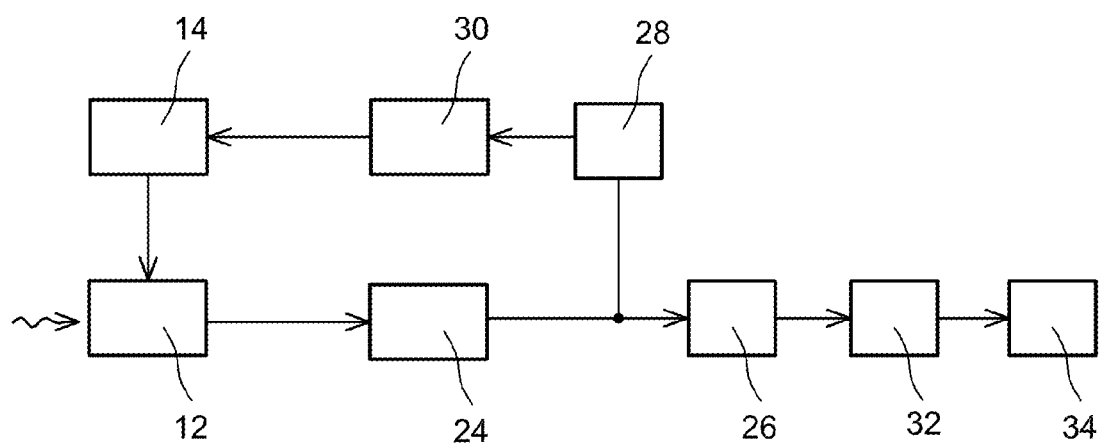

FIG. 7 is a schematic view of a second example of the light measuring system, object of the invention. It comprises:

the photon counting device 12, the voltage supply device 14, for providing the supply voltage to the photon counting device 12, first and second amplifiers 24 and 26 connected in series, for amplifying the signals provided by the photon counting device 12, a first processing device 28 for acquiring the signals amplified by the first amplifier 24, forming the histogram, determining both consecutive peaks and producing the error signal as has been seen before.

The system of FIG. 7 also comprises a regulation device 30, for example of the PID type, which receives the error signal and controls the voltage supply device 14 for regulating the voltage from the error signal.

The system of FIG. 7 also comprises a second processing device 32 for processing the amplified signals, coming from the second amplifier 26, so as to count the photons. This device 32 is provided with a device 34 for displaying the results.

The photon counting device, discussed in the examples of the invention, can be an MPPC® detector or, more generally, any SiPM (Silicon PhotoMultiplier)-type device enabling the "natural" generation of a signal equivalent to a photo-electron and sometimes to two or three, so as to "initiate" feedback, that is allowing the start thereof.

The invention is claimed is:

1. A method for controlling the gain of a multiple pixel photon counting device, comprising an array of avalanche photodiodes, the device being supplied with voltage and providing a signal when it detects photons, comprising the following steps of:

acquiring the signals provided by the device for predefined periods, until a predefined total measurement time is reached, forming an amplitude histogram, including a set of peaks, from the signal acquired during the predefined periods, the amplitude histogram relating amplitudes of counts in said signal to the number of counts at these amplitudes, determining the respective positions of two consecutive peaks, measurable on the amplitude histogram, producing an error signal representing a deviation between both consecutive peaks, and regulating the voltage which supplies the device based on the error signal to thereby, keep the deviation equal to a predefined set point.

2. The method according to claim 1, wherein the predefined periods are equal to each other and chosen in an interval ranging from 50 ns to 500 ns.

3. The method according to claim 1, wherein the predefined total measurement time is chosen in an interval ranging from 0.5 s to 10 s.

4. The method according to claim 1, wherein the two consecutive peaks are the first and second peaks of the amplitude histogram.

5. The method according to claim 1, wherein the multiple pixel photon counting device is a multi-pixel photon counter.

6. A light-measuring system comprising:

a photon counting device comprising an array of avalanche photodiodes and providing a signal when it detects photons, a supply device for providing a voltage to the photon counting device, an amplification device for amplifying the signals provided by the photon counting device and providing an amplified signal, and a processing device for acquiring the amplified signal for predefined periods, until a predefined total measurement time is reached, for processing the same so as to count the photons, for forming an amplitude histogram, including a set of peaks, from the signal acquired during the predefined periods, the amplitude histogram relating amplitudes of counts in said signal to the number of counts at these amplitudes, for determining the respective positions of two consecutive peaks, measurable on the amplitude histogram, and for producing an error signal representing a deviation between both consecutive peaks, and a regulation device for controlling the supply device by regulating the voltage provided to the photon counting device based on the error signal.

7. A light-measuring system comprising:

a photon counting device comprising an array of avalanche photodiodes and providing a signal when it detects photons, a supply device for providing a voltage to the photon counting device, first and second amplification devices connected in series, the first amplification device amplifying the signal provided by the photon counting device and providing a first amplified signal, the second amplification device amplifying the first amplified signal and providing a second amplified signal, a first processing device for acquiring the first amplified signal during predefined periods until a predefined total measurement time is reached, for forming an amplitude histogram, including a set of peaks, from the signal acquired during the predefined periods, the amplitude histogram relating amplitudes of counts in said signal to the number of counts at these amplitudes, for determining the respective positions of two consecutive peaks, measurable on the amplitude histogram, and for producing an error signal representing a deviation between both consecutive peaks, a regulation device for controlling the supply device by regulating the voltage provided to the photon counting device based on the error signal, and a second processing device for processing the second amplified signals so as to count the photons.

\* \* \* \* \*